United States Patent
Friedman (10) Patent No.: US 9,172,943 B2
(45) Date of Patent: Oct. 27, 2015

(54) DYNAMIC MODIFICATION OF VIDEO CONTENT AT A SET-TOP BOX DEVICE

(75) Inventor: Lee Friedman, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 797 days.

(21) Appl. No.: 12/962,009

(22) Filed: Dec. 7, 2010

(65) Prior Publication Data

US 2012/0140025 A1    Jun. 7, 2012

(51) Int. Cl.

| | | |
|---|---|---|
| H04N 13/00 | (2006.01) | |
| H04N 21/43 | (2011.01) | |
| H04N 21/435 | (2011.01) | |
| H04N 21/44 | (2011.01) | |
| H04N 21/462 | (2011.01) | |
| H04N 21/472 | (2011.01) | |
| H04N 21/81 | (2011.01) | |
| H04N 21/84 | (2011.01) | |

(52) U.S. Cl.
CPC ......... H04N 13/0059 (2013.01); H04N 13/004 (2013.01); H04N 13/007 (2013.01); H04N 13/0066 (2013.01); H04N 21/435 (2013.01); H04N 21/4307 (2013.01); H04N 21/44012 (2013.01); H04N 21/4622 (2013.01); H04N 21/47205 (2013.01); H04N 21/816 (2013.01); H04N 21/84 (2013.01)

(58) Field of Classification Search
USPC .......................................................... 348/42
See application file for complete search history.

(56) References Cited

U.S. PATENT DOCUMENTS

| | | | |
|---|---|---|---|
| 6,018,768 | A | 1/2000 | Ullman et al. |
| 6,304,855 | B1 | 10/2001 | Burke |
| 6,959,099 | B2 | 10/2005 | Gutta et al. |
| 7,120,924 | B1 | 10/2006 | Katcher et al. |
| 7,306,522 | B2 * | 12/2007 | Silver et al. ..................... 463/41 |
| 7,334,249 | B1 | 2/2008 | Byers |
| 7,360,234 | B2 | 4/2008 | Robson et al. |
| 7,565,139 | B2 | 7/2009 | Neven, Sr. et al. |
| 7,568,214 | B2 | 7/2009 | Leak et al. |
| 7,584,491 | B2 | 9/2009 | Bruckner et al. |

(Continued)

FOREIGN PATENT DOCUMENTS

WO    2007035558 A2    3/2007

OTHER PUBLICATIONS

"Custom Object Recognition Software Development", Dynamic Ventures, retrieved Apr. 13, 2010, <http://imagegraphicsvideo.com/ms/001/ObjectRecognition.html>, 2 pages.

(Continued)

*Primary Examiner* — Christopher S Kelley
*Assistant Examiner* — Asmamaw G Tarko
(74) *Attorney, Agent, or Firm* — Toler Law Group, PC (57) ABSTRACT

A particular method includes receiving video content at a set-top box device. Scene data defining a three-dimensional scene is accessed, where the scene data includes object data defining at least one three-dimensional graphical object, and where the scene data is accessed based at least in part on information associated with the video content. The method further includes processing the object data to render the at least one three-dimensional graphical object. The rendered at least one three-dimensional graphical object is overlaid on a portion of the video content, thereby generating dynamically modified video content. The method includes sending the dynamically modified video content to a display device.

19 Claims, 5 Drawing Sheets

(56) References Cited

U.S. PATENT DOCUMENTS

| | | | |
|---|---|---|---|
| 7,970,235 | B1 | 6/2011 | Bergman et al. |
| 8,615,596 | B1 | 12/2013 | Upadhyay et al. |
| 2002/0024517 | A1 | 2/2002 | Yamaguchi et al. |
| 2002/0059644 | A1 | 5/2002 | Andrade et al. |
| 2002/0122137 | A1 | 9/2002 | Chen et al. |
| 2002/0162118 | A1 | 10/2002 | Levy et al. |
| 2003/0028873 | A1 | 2/2003 | Lemmons |
| 2004/0031062 | A1 | 2/2004 | Lemmons |
| 2004/0257369 | A1 | 12/2004 | Fang |
| 2004/0261096 | A1 | 12/2004 | Matz |
| 2004/0268419 | A1 | 12/2004 | Danker et al. |
| 2005/0026690 | A1* | 2/2005 | Silver et al. ............ 463/41 |
| 2005/0117798 | A1 | 6/2005 | Patton et al. |
| 2005/0120391 | A1 | 6/2005 | Haynie et al. |
| 2005/0138674 | A1 | 6/2005 | Howard et al. |
| 2006/0107289 | A1 | 5/2006 | DeYonker et al. |
| 2006/0117343 | A1 | 6/2006 | Novak et al. |
| 2007/0214476 | A1 | 9/2007 | Zalewski et al. |
| 2007/0226761 | A1 | 9/2007 | Zalewski et al. |
| 2008/0046920 | A1 | 2/2008 | Bill |
| 2008/0125098 | A1* | 5/2008 | Bruce et al. ............ 455/414.1 |
| 2008/0168489 | A1 | 7/2008 | Schraga |
| 2008/0201369 | A1 | 8/2008 | Cordoba |
| 2008/0254740 | A1 | 10/2008 | Tofigh et al. |
| 2009/0041311 | A1 | 2/2009 | Hundley |
| 2009/0141940 | A1 | 6/2009 | Zhao et al. |
| 2009/0249393 | A1* | 10/2009 | Shelton et al. .............. 725/39 |
| 2010/0027961 | A1* | 2/2010 | Gentile et al. .............. 386/52 |
| 2010/0058405 | A1* | 3/2010 | Ramakrishnan et al. ...... 725/97 |
| 2010/0107187 | A1* | 4/2010 | Krantz et al. .............. 725/32 |
| 2010/0118119 | A1* | 5/2010 | Newton et al. .............. 348/42 |
| 2010/0122286 | A1 | 5/2010 | Begeja et al. |
| 2011/0063415 | A1 | 3/2011 | Gefen et al. |
| 2011/0119709 | A1* | 5/2011 | Kim et al. ............... 725/39 |
| 2011/0157170 | A1* | 6/2011 | Bennett et al. ............. 345/419 |
| 2011/0161843 | A1* | 6/2011 | Bennett et al. ............. 715/760 |
| 2011/0169913 | A1* | 7/2011 | Karaoguz et al. ........... 348/42 |
| 2011/0321082 | A1 | 12/2011 | Weerasinghe |
| 2012/0023543 | A1* | 1/2012 | Shelton et al. ............. 725/134 |
| 2012/0086772 | A1* | 4/2012 | Shintani et al. ............ 348/42 |
| 2012/0140048 | A1* | 6/2012 | Levine ................. 348/51 |
| 2012/0287233 | A1* | 11/2012 | Wang et al. ............. 348/42 |
| 2012/0310791 | A1* | 12/2012 | Weerasinghe ............ 705/27.2 |
| 2013/0141530 | A1 | 6/2013 | Zavesky |

OTHER PUBLICATIONS

"Face Tracking", 2004-2010 Pittsburgh Pattern Recognition, Inc., retrieved Apr. 13, 2010, <http://www.pittpatt.com/face_tracking/>, 2 pages.

"Image Recognition Software Breakthrough", ScienceDaily, published Jan. 23, 2009, <http://www.sciencedaily.com-/releases/2009/01/090108082912.htm>, 2 pages.

"List of Video Editing Software—Wikipedia, the free encyclopedia", Wikipedia.org, retrieved Apr. 13, 2009, <http://en.wikipedia.org/wiki/List_of_video_editing_software>, 5 pages.

"MCEBuddy: Convert, Shrink, and Remove Ads for Your Media Center", Tyrell Pty Ltd, published 2010, retrieved Apr. 13, 2010, <http://mcebuddy.com/>, 1 page.

"PG-13 ain't what is used to be", Blogcritics.org, published Jul. 16, 2004, <http://www.blogcritics.org/video/article/pg-13-aint-what-is-used/>, 7 pages.

"SnapStream Beyond TV: PC DVR software", Snapstream Media, Inc., retrieved Apr. 13, 2010, <http://www.snapstream.corn/products/beyondtv/>, 2 pages.

Avidan, S., et al., "Seam Carving for Content-Aware Image Resizing", SIGGRAPH '07, ACM SIGGRAPH 2007, vol. 26, Issue 3, Article No. 10, Jul. 2007, ACM, New York, 9 pages.

Bay, H., et al., "SURF: Speeded up Robust Features", Computer Vision—ECCV 2006, 2006, Springer Berlin Heidelberg, pp. 404-417.

Bitouk, D. et al., "Face Swapping: Automatically Replacing Faces in Photographs," CAVE Projects, Retrieved from <http://www1.cs.columbia.edu/CAVE/projects/face_replace/>, Retrieved on Apr. 12, 2010, 3 pages.

Cheng, Y., et al., "3-D-Model-based Face Replacement in Video", Proceedings SIGGRAPH 2009, Article No. 29, 2009, ACM, New York, NY, 1 page.

Chuang, Y. et al., "A Bayesian Approach to Digital Matting", Proceedings of IEEE Computer Vision and Pattern Recognition 2001, vol. II, Dec. 2001, pp. 264-271.

Chuang, Y. et al., "Shadow Matting and Compositing", Proceedings of ACM SIGGRAPH 2003, vol. 22, No. 3, Jul. 2003, pp. 494-500.

Criminisi, A. et al., "Object Removal by Exemplar-Based Inpainting", Proceedings of IEEE Computer Vision and Pattern Recognition, vol. 2, Jun. 2003, IEEE, pp. II-721-II-728.

Daum, M. et al., "On 3-D Surface Reconstruction Using Shape from Shadows", Proceedings 1998 IEEE Computer Society Conference on Computer Vision and Pattern Recognition, Jun. 1998, pp. 461-468.

Ebrahimi, M. et al., "SUSurE: Speeded up Surround Extrema Feature Detector and Descriptor for Realtime Applications", CVPR Workshops 2009, IEEE Computer Society Conference on Computer Vision and Pattern Recognition Workshops, Jun. 2009, IEEE, pp. 9-14.

Eldon, E., "Yahoo buying Maven Networks, to serve online video ads for big media", VentureBeat, published Jan. 31, 2008, <http://venturebeat.com/2008/01/31/yahoo-buying-maven-networks-to-serve-online-video-ads-for-big-media>, 6 pages.

Goldman, D. et al., "Shape and Spatially-Varying BRDFs From Photometric Stereo", IEEE Transactions on Pattern Analysis and Machine Intelligence, vol. 32, Issue 6, Jun. 2010, IEEE Computer Society, pp. 1060-1071.

Hachman, M., "Hands off with Google Goggles", PCMag.com, published Dec. 8, 2009, <http://www.pcmag.com/article2/0,2817,2356786,00.asp>, 5 pages.

Huang, J. et al., "Image Indexing Using Color Correlograms", Proceedings 1997 IEEE Computer Society Conference on Computer Vision and Pattern Recognition, Jun. 1997, IEEE, pp. 762-768.

Hybrid Broadcast Broadband TV (HbbTV), retrieved Apr. 13, 2010, <http://www.hbbtv.org/>, 1 page.

International Search Report and Written Opinion of the International Searching Authority, International Application No. PCT/US2012/066797, European Patent Office, Apr. 17, 2014, 9 pages.

Jeong, C. et al, "Appearance-Based Nude Image Detection," ICPR 2004, Proceedings of the 17th International Conference on Pattern Recognition, vol. 4, Aug. 2004, IEEE, pp. 467-470.

Kennedy, L. et al., "Internet Image Archaeology: Automatically Tracing the Manipulation History of Photographs on the Web", MM '08, Proceedings of the 16th ACM International Conference on Multimedia, ACM, New York, NY, pp. 349-358.

Kenny, L. et al., "LSCOM Lexicon Definitions and Annotations (Version 1.0)", DTO Challenge Workshop on Large Scale Concept Ontology for Multimedia, Columbia University Advent Technical Report #217-2006-3, Mar. 2006, 88 pages.

Koenderink, J. et al., "Affine Structure from Motion", Journal of the Optical Society of America, Feb. 1991, vol. 8, No. 2, pp. 377-385.

Lee, K. et al., "Detecting Music in Ambient Audio by Long-Window Autocorrelation", Proceedings of the IEEE International Conference on Acoustics, Speech, and Signal Processing, ICASSP 2008, Apr. 2008, IEEE, Piscataway, NJ, 4 pages.

Liu, Z. et al., "AT&T Research at TRECVID 2010", In Proceedings TRECVID Workshop 2011, 2011, AT&T Labs Research, pp. 5-7.

Lowe, D., "Object Recognition from Local Scale-Invariant Features", Proceedings of the Seventh IEEE International Conference on Computer Vision, vol. 2, Sep. 1999, pp. 1150-1157.

O'Dell, J., "Machine Vision on the Horizon: Vitamin D Launches Object Recognition for Video", ReadWriteWeb, published Sep. 23, 2009, <http://www.readwriteweb.com/readwritestart/2009/09/vitamin-d-video.php>, 5 pages.

Ogle, J. et al., "Fingerprinting to Identify Repeated Sound Events in Long-Duration Personal Audio Recordings", ICASSP 2007, IEEE International Conference on Acoustics, Speech and Signal Processing, Apr. 2007, IEEE, pp. I-233-I-236.

(56) References Cited

OTHER PUBLICATIONS

Ojala, T. et al., "Multiresolution Gray-Scale and Rotation Invariant Texture Classification with Local Binary Patterns", IEEE Transactions on Pattern Analysis and Machine Intelligence, vol. 24, Issue 7, Jul. 2002, pp. 971-987.

Petrovic, V. et al., "Automated Analysis of Deformable Structures in Groups of Images", BMVC 2007, In Proceedings of the British Machine Vision Conference 2007, Sep. 2007, pp. 1-10.

Rosten, E. et al., "Machine Learning for High-Speed Corner Detection", ECCV '06, Proceedings of the 9th European Conference on Computer Vision, vol. 1, 2006, Springer-Verlag, Verlag, pp. 430-443.

Snavely, N. et al., "Photo Tourism: Exploring Photo Collections in 3D", ACM Transactions on Graphics (TOG)—Proceedings of ACM SIGGRAPH 2006, vol. 25, Issue 3, Jul. 2006, ACM, New York, NY, pp. 835-846.

Stricker, M. et al., "Similarity of Color Images", IS&T/SPIE's Symposium on Electronic Imaging: Science & Technology, International Society for Optics and Photonics, Mar. 1995, pp. 381-392.

Tola, E. et al., "Daisy: An Efficient Dense Descriptor Applied to Wide-Baseline Stereo", IEEE Transactions on Pattern Analysis and Machine Intelligence, vol. 32, Issue 5, Apr. 2009, IEEE Computer Society, pp. 815-830.

Wildstrom, S., "Supreme Court: Cablevision Remote DVR is OK", BusinessWeek, published Jun. 29, 2009, <http://www.businessweek.com/the_thread/techbeat/archives/2009/06/supreme_court_c.html>, 8 pages.

Zhang, L. et al., "Rapid Shape Acquisition Using Color Structured Light and Multi-pass Dynamic Programming", Proceedings First International Symposium on 3D Data Processing Visualization and Transmission, 2002, IEEE, pp. 24-36.

Zhou, C. et al., "Coded Aperture Pairs for Depth from Defocus", 2009 IEEE 12th International Conference on Computer Vision, Oct. 2009, IEEE, pp. 325-332.

Zhou, C. et al., "Depth from Diffusion", 2010 IEEE Conference on Computer Vision and Pattern Recognition (CVPR), Jun. 2010, IEEE, pp. 1110-1117.

* cited by examiner

DYNAMIC MODIFICATION OF VIDEO CONTENT AT A SET-TOP BOX DEVICE

BACKGROUND

Certain systems have been developed in an attempt to integrate interactive components with television content or other video content. Many of these systems increase production costs and complexity of television programming. For example, the production costs involved in content creation and integration of interactive components into the created content may be financially impractical.

DETAILED DESCRIPTION

The techniques disclosed herein may enable dynamic modification of video content at an end-user device such as a set-top box. Thus, production costs to generate interactive content may remain unchanged relative non-interactive content. Additionally, previously produced content, such as existing movies or television program content, can be modified using embodiments disclosed herein to add interactive elements and features.

In a particular embodiment, a method includes receiving video content at a set-top box device. The method also includes accessing scene data defining a three-dimensional scene. The scene data includes object data defining at least one graphical object (e.g., a two-dimensional representation or a three-dimensional representation), where the scene data is accessed based at least in part on information associated with the video content. The method further includes processing the object data to render the at least one graphical object and to overlay the rendered at least one graphical object over a portion of the video content to generate dynamically modified video content. The method includes sending the dynamically modified video content to a display device.

In another particular embodiment, a set-top box device includes a processor and a memory accessible to the processor. The memory stores instructions that are executable by the processor to receive video content and to access scene data defining a three-dimensional scene. The scene data includes object data defining at least one graphical object (e.g., a two-dimensional representation or a three-dimensional representation), where the scene data is accessed based at least in part on information associated with the video content. The instructions are also executable to process the object data to render the at least one graphical object and to overlay the rendered at least one graphical object over a portion of the video content to generate dynamically modified video content. The instructions are further executable to output the dynamically modified video content for display at a display device.

In another particular embodiment, a non-transitory computer-readable medium includes instructions that, when executed by a processor, cause the processor to receive video content and to access scene data defining a three-dimensional scene. The scene data includes object data defining at least one graphical object (e.g., a two-dimensional representation or a three-dimensional representation), where the scene data is accessed based at least in part on information associated with the video content. The instructions are also executable to process the object data to render the at least one graphical object and to overlay the rendered at least one graphical object over a portion of the video content to generate modified video content. The instructions are further executable to output the modified video content for display at a display device.

Figure 1:
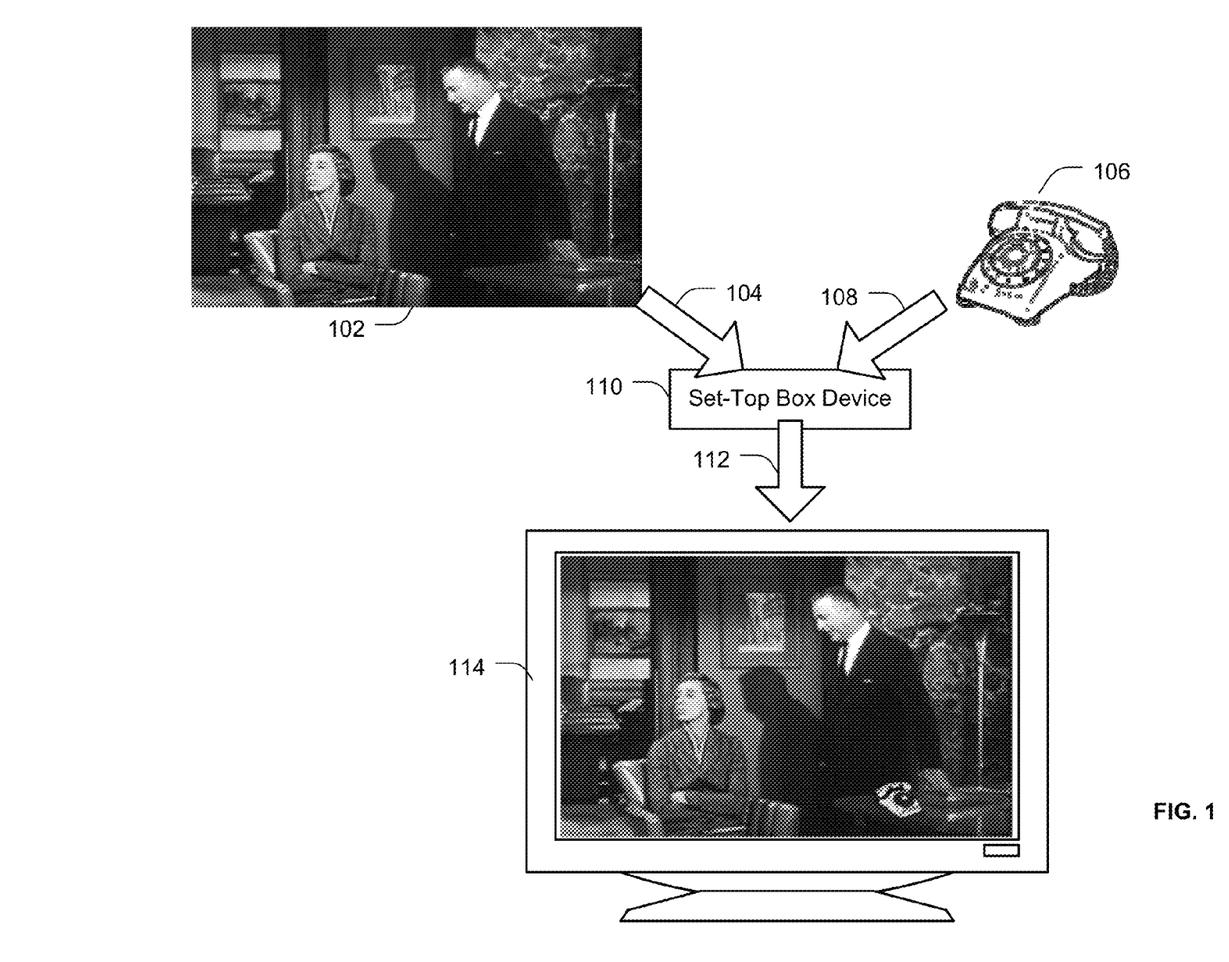
FIG. 1 is a diagram illustrating a particular embodiment of a system to dynamically modify video content at a set-top box device.

FIG. 1 illustrates a particular embodiment of generating interactive content using existing media content. In particular, FIG. 1 illustrates mixing existing video content and a graphical object without modifying the existing video content. In FIG. 1, existing video content 102, such as a television program, may be sent via a media stream 104 to an end-user device, such as a set-top box device 110. Additionally, interactive content such as scene data 106 identifying one or more graphical objects (e.g., a two-dimensional or three-dimensional representation) may be sent via a second stream 108 to the set-top box device 110. The set-top box device 110 may include a graphics engine (not shown) that is capable of rendering the scene data to generate a graphical display (e.g., a two-dimensional or a three-dimensional graphical rendering) including one or more graphical objects and to overlay the one or more graphical objects over the existing video content 102 to generate modified video content 112. The modified video content 112 may be sent to a display 114 coupled to the set-top box device 110.

In a particular embodiment, the scene data 106 includes data to render three-dimensional objects. For example, the scene data 106 may include information associated with the geometry of a three-dimensional object, information describing lighting of the three-dimensional object in a three-dimensional scene, information descriptive of scaling on the three-dimensional object in the three-dimensional scene, information related to physics governing the three-dimensional scene (e.g., whether or not to apply gravity via a physics engine executed in the set-top box 110), information about animating the three-dimensional object within the scene, information describing physical characteristics of the three-dimensional object, other information descriptive of the scene or the object, or any combination thereof. In the particular embodiment illustrated in FIG. 1, the scene data 106 includes data descriptive of a three-dimensional rotary telephone.

In a particular embodiment, the set-top box device 110 enables a user to interact with a graphical object mixed with (e.g., overlaid on) the existing media content in real-time. For example, the set-top box device 110 may be adapted to receive user input (e.g., via a mouse, a keyboard, a remote control device, a tablet, a two-dimensional or three-dimensional tracking camera, a game controller, etc.) and to modify or animate the graphical object based on the user input. In an illustrative embodiment, the user may interact with and manipulate a displayed two-dimensional or three-dimensional object in real-time without modifying the existing media content. For example, the user interacting with the set-top box device 110 may be able to rotate the three-dimensional object to view another portion of the three-dimensional object. The user may also be able to move the three-dimensional object within the scene (e.g., such that the object appears behind or in front of other objects in the video content 102). Additionally, a graphics engine (not shown) executing within the set-top box device 110 may determine graphical properties of the object. For example, the graphical properties may include which portions of the three-dimensional object are visible (e.g., should be rendered within the modified video content 112) shading properties of the object, scaling properties of the object, orientation of the object, texture mapping of the object, other graphical properties, or any combination thereof. In the particular embodiment illustrated in FIG. 1 the modified video content 112 includes a rendering of the rotary telephone described by the scene data 106 on a pre-existing desk of the video content 102. It will be appreciated that the properties of the rotary telephone, such as shading, size, and orientation, may be modified such that the rotary telephone "blends" into the scene.

In another particular embodiment, the user may be able to interact with the video content 102 using the three-dimensional object. For example, the three dimensional object may include a ball, a pie, or some other object that the user desires to "throw" within a scene depicted by the video content 102. The physics engine executing within the set-top box device 110 may determine simulated motion of the object in response to user input. For example, in the embodiment depicted in FIG. 1, the physics engine may simulate an incoming call at the rendered rotary telephone by causing the rendered rotary telephone to change color or oscillate on the desk.

In a particular embodiment, timing data may be sent to the set-top box device 110, either from a content provider of the video content 102 or from a content provider of the scene data 106. The content providers may be the same or may be different providers. The timing data may indicate which particular portions of the video content 102 are associated with three-dimensional graphical objects. For example, the timing data may indicate particular three-dimensional graphical objects to be placed within scenes of the video content 102. The timing data may be received separately from the scene data 106, separately from the video content 102, or separately from both the video content 102 and the scene data 106. For example, the timing data may be pre-loaded to the set-top box device 110 such that the timing data is available when the video content 102 is received at the set-top box device 110. Accordingly, the set-top box device 110 may utilize the timing data while the video content 102 is received in order to access the scene data 106. In another example, the scene data 106 may be pre-loaded at the set-top box device 110. In this example, the set-top box device 110 may use the timing data to determine when to access the scene data 106 from a memory of the set-top box device 110.

It will be appreciated that the system of FIG. 1 may enable the content provider of the video content 102 to provide unaltered video content 102 to users, without incurring additional production costs, and the set-top box device 110 may mix the scene data 106 with the video content 102 to generate the modified video content 112, which may provide interactive features to the user. Thus, existing video content may be dynamically transformed into interactive video content without imposition of production costs on content creators (e.g., television studios or movie studios).

Figure 2:
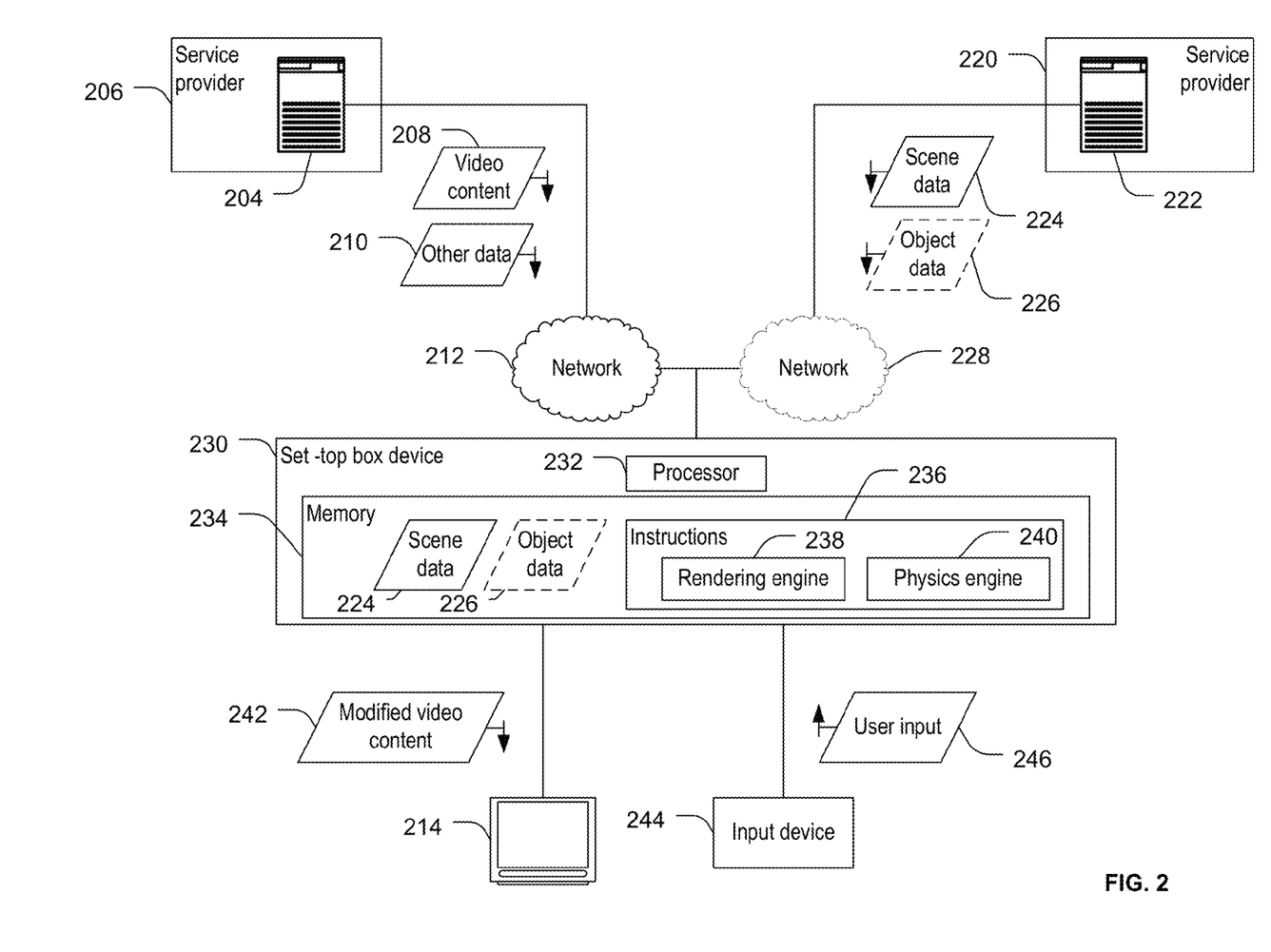
FIG. 2 is a diagram illustrating another particular embodiment of a system to dynamically modify content at a set-top box device.

FIG. 2 illustrates a block diagram of another system of generating modified video content. The system includes a service provider 206 that has a video content server 204. For example, the service provider 206 may include an Internet Protocol television (IPTV) service provider that provides IPTV content via a network 212 to one or more set-top box devices 230. For example, the service provider 206 may send video content 208 and other data 210 via the network 212 to subscribers. In a particular embodiment, the network 212 may include a private access network, such as an IPTV access network. In other embodiments, the network 212 may include a public network.

The system also includes a second service provider 220. The second service provider 220 may be an interactive content service provider that has an interactive content server 222. The interactive content server 222 may be adapted to send scene data 224 and object data 226 to the one or more set-top box devices 230 via a network 228. In a particular embodiment, the object data 226 is included in the scene data 224. Alternately, the object data 226 may be separate from the scene data 224.

In a particular embodiment, the networks 212 and 228 are the same network. For example, the networks 212 and 228 may each be part of a private access network of the content providers 206 and 220, or the networks 212 and 228 may be a public network (e.g., the Internet). In another embodiment, the networks 212 and 228 are separate networks. For example the network 212 may be a private access network while the network 228 may be a public network.

The set-top box device 230 may include a processor 232 and a memory 234. The memory 234 may include instructions 236 that are executable by the processor 232 to perform various functions of the set-top box device 230. For example, the instructions 236 may include instructions representative of or executable to cause execution of a rendering engine 238 and a physics engine 240.

In a particular embodiment, the rendering engine 238 is adapted to determine visual characteristics of a graphical object (e.g., a two-dimensional or a three-dimensional graphical object) that is based on the scene data 224 and the object data 226. For example, the rendering engine 238 may be adapted to determine scaling, lighting, surface texture, geometry, position, orientation, and other characteristics of an object to be displayed. The physics engine 240 may be adapted to simulate physical characteristics and interactions of one or more three-dimensional objects. For example, the physics engine 240 may use physical characteristic data associated with the scene data 224 or the object data 226 to determine how two or more objects will interact before, during, and after a collision. In another example, the physics engine 240 may use the physical characteristic data to determine motion paths of physical objects (e.g., whether and how simulating gravity will affect one or more objects).

In a particular embodiment, the memory 234 of the set-top box device 230 stores the scene data 224 and the object data 226. For example, the scene data 224 and the object data 226 may be pre-loaded to the memory 234, such that the scene data 224 and the object data 226 are available on-demand to the rendering engine 238 and the physics engine 240. The pre-loaded scene data 224 and object data 226 may be used to generate modified video content 242 that is provided to a display 214 (e.g., a television capable of two-dimensional and/or three-dimensional output) coupled to the set-top box device 230.

For example, a particular graphical object may be timed to overlap a particular scene within the video content 208. Accordingly, the data 210 may include timing data or other information indicating when the particular scene of the video content 208 begins. The scene data 224 and the object data 226 may be accessed from the service provider 220 or from the memory 234 based on the timing data in order to be rendered by the rendering engine 238. For example, graphical objects rendered by the rendering engine 238 may be overlaid on the video content 208 to generate the modified video content 242. In a particular embodiment, the rendering engine 238 may render a graphical object based on the object data 226. The rendering engine 238 may also render the video content 208 and store the rendered video content 208 in a buffer of the memory 234. The set-top box device 230 may generate an alpha channel in order to place the video content 208 behind the rendered graphical object. The rendering engine 238 may provide a transparency layer as a background to enable overlaying the graphical object over the video content 208 without modifying the video content 208.

In a particular embodiment, the set-top box device 230 may also be associated with an input device 244. For example, the input device 244 may include a keyboard, a cursor control device (such as a mouse), a motion capture device (such as a gesture camera), a remote control device, another user input device, or any combination thereof. The input device 244 may be utilized by a user to provide user input 246. In response to the user input 246, the physics engine 240 and the rendering engine 238 may modify the displayed video content 242 to simulate interaction between the user and inserted graphical object(s).

In a particular embodiment, the object data 226 includes a set of object data associated with a plurality of three-dimensional graphical objects. Particular object data may be selected from the set of object data to render a particular three-dimensional graphical object in the modified video content 242. For example, the particular three-dimensional graphical object may be selected based on information received from the service provider 206, the second service provider 220, or via the user input 246.

In another particular embodiment, the object data 226 includes one or more user-defined objects. For example, the one or more user-defined objects may include a graphical representation or image of the user, and may enable the user to "insert" themselves into a television show or movie. In another example, the graphical user-defined objects may be objects that were provided by the interactive content service provider 220 and modified by the user. For example, the user may be able to select and modify the lighting of a particular scene by modifying the scene data 224. In another example, the user may be able to modify physical characteristics such as geometry or motion characteristics associated with a particular three-dimensional graphical object. In yet another example, the user may be able to select a color, shading, or surface texture associated with the three-dimensional graphical object in the modified video content 242.

In a particular embodiment, the data 210 includes timing information. The timing information may associate the scene data 224 and the object data 226 with portions of the video content 208. The object data 226 may be selected from amongst object data of multiple objects based at least partially on the timing data. In a particular embodiment, the timing data is received via a first data stream and the video content 208 is received via a second data stream. For example, the service provider 206 may send the video content 208 in an unaltered form to the set-top box device 230 via the first data stream and may send the data 210 via the second data stream. In a particular embodiment, the second data stream is addressed to a different multicast group or unicast recipient than the first data stream or addressed to a separate port of the set-top box device 230 than the first data stream.

Alternately, the data 210 may be sent as a modified portion or addition to the video content 208. For example, the data 210 may be included within an added closed captioning stream associated with the video content 208. In another example, the data 210 may be included in vertical blanking interval data associated with video content 208.

Accordingly, the system illustrated in FIG. 2 may enable generation of modified video content 242 based on video content 208 provided by a video content service provider 206 and scene data 224 provided by an interactive content service provider 220. The interactive content service provider 220 and the video content service provider 206 may be distinct content providers. For example, the video content service provider 206 may provide unaltered video content 208. The interactive content service provider 220 may provide all of the information needed to generate the modified video content 242 from the video content 208. In another example, the video content service provider 206 may provide the video content 208 and the data 210 that is used to facilitate generation of the modified video content 242. For example, the data 210 may include timing information indicating a particular time or location within a particular scene of the video content 208 at which a three-dimensional graphical object may be inserted or overlaid. Thus, the system illustrated in FIG. 2 may enable relatively inexpensive generation of interactive content, including user-defined interactive content, at a set-top box device 230.

Figure 3:
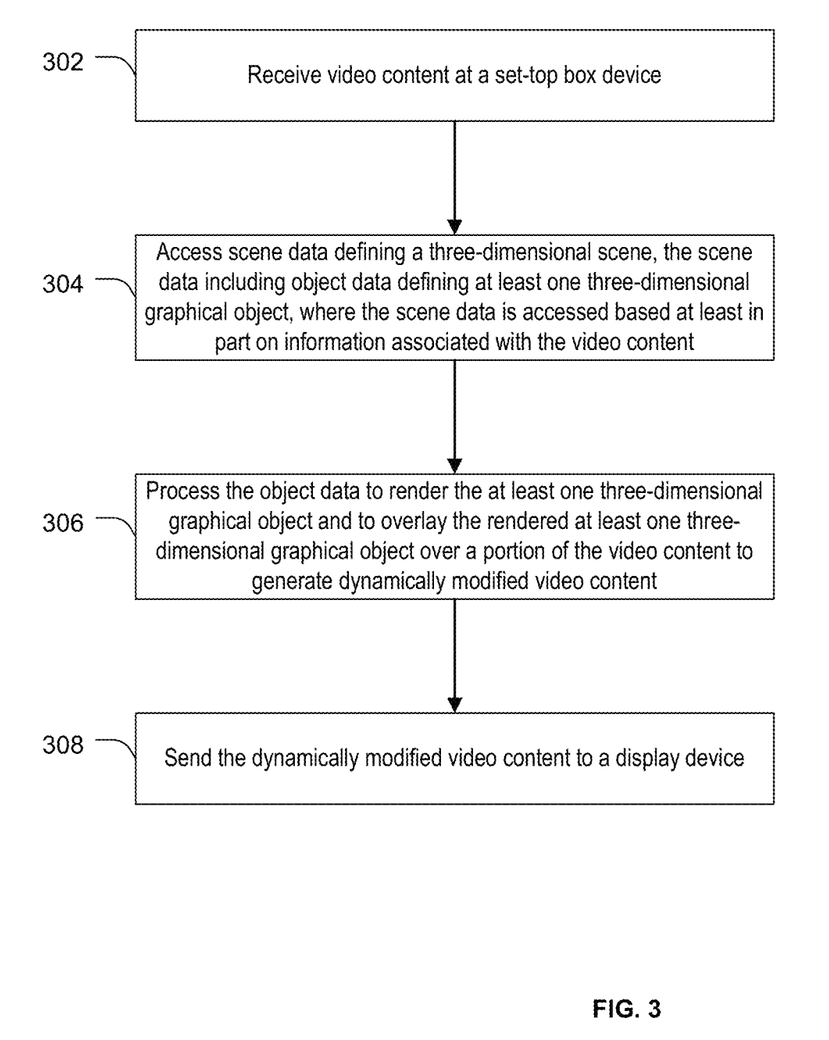
FIG. 3 is a flow chart illustrating a particular embodiment of a method of dynamically modifying content at a set-top box device.

FIG. 3 illustrates a flow chart of a first particular embodiment of a method of generating modified video content including interactive content. In an illustrative embodiment, the method may be performed at the system of FIG. 1 or the system of FIG. 2.

The method includes, at 302, receiving video content at a set-top box device. For example, the video content may include unmodified video content associated with a television program, a movie, a sporting event, or other video content.

The method also includes, at 304, accessing scene data defining a three-dimensional scene. The scene data may include object data that defines at least one three-dimensional graphical object. The scene data may be accessed based at least partially on information associated with the video content. For example, the set-top box device or an interactive content service provider may have access to various scene data associated with a large number of three-dimensional scenes. A particular three-dimensional scene may be selected based on the video content or a particular scene of the video content. The scene data and/or the object data may include information describing how to render the at least one three-dimensional graphical object in a display. For example, the scene data and/or the object data may include geometry, scaling, lighting, surface texture, motion characteristic, physical characteristic, or other information.

The method may also include, at 306, processing the object data to render the at least one three-dimensional graphical object and to overlay the rendered at least one three-dimensional graphical object over a portion of the video content. By overlaying the at least one three-dimensional graphical object over a portion of the video content, dynamically modified video content may be generated. The method may also include, at 308, sending the dynamically modified video content to a display device.

Accordingly, the method of FIG. 3 may enable dynamic modification of video content at a set-top box device to provide user interactive content. The user interactive content may be generated without increasing production costs or complexity of the video content, since the interactive content may be added at the set-top box device rather than into the video content itself. Moreover, different set-top boxes may generate different (e.g., personalized) interactive versions of the same scene. Thus, pre-existing video content may be dynamically customized and personalized without burdening a video content provider. The ability to dynamically customize and personalize video content may provide revenue opportunities to generators of scene data, object data, and timing data (e.g., third-party interactive service content providers or existing video content providers looking to introduce interactive content offerings).

Figure 4:
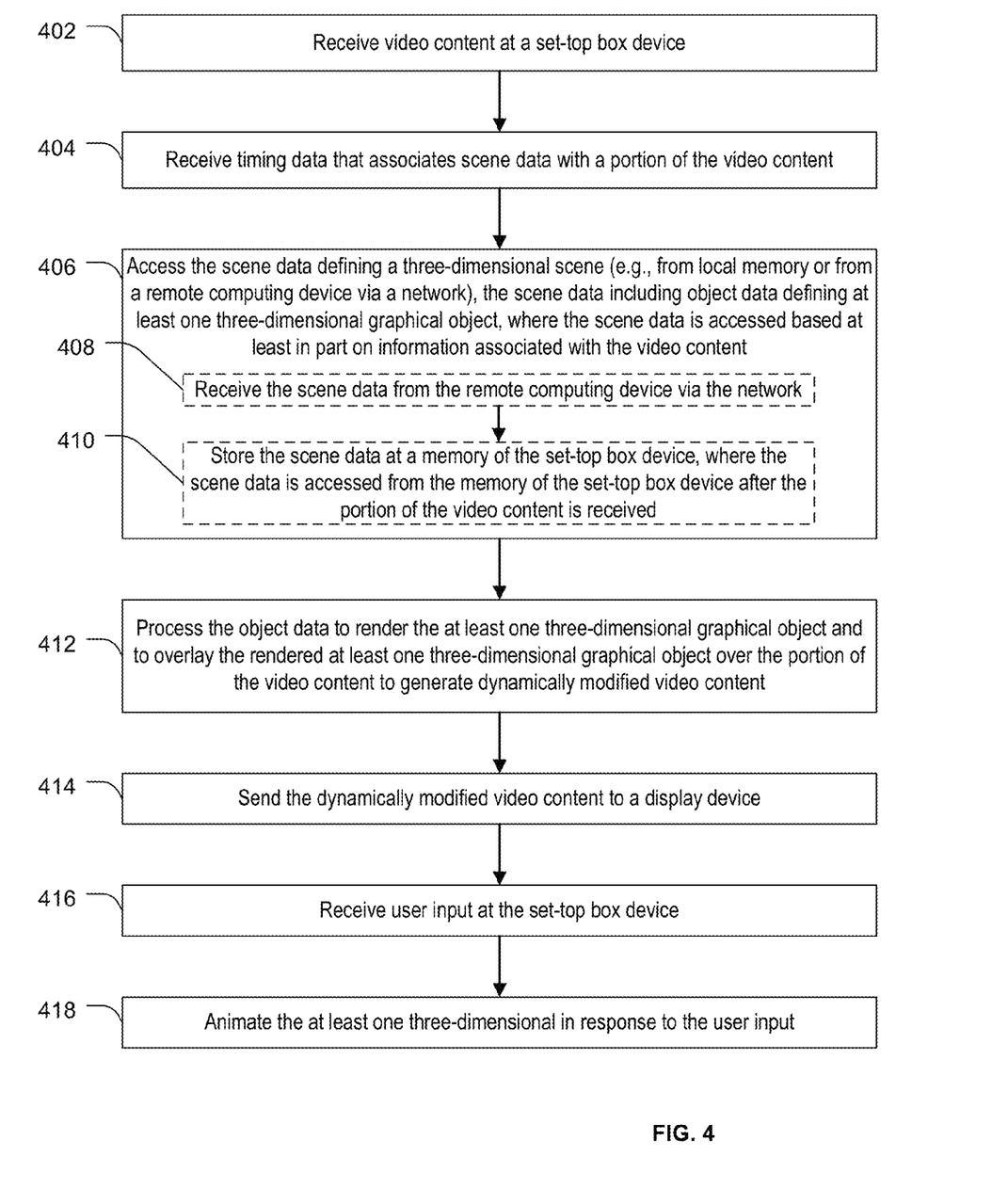
FIG. 4 is a flow chart illustrating another particular embodiment of a method of dynamically modifying content at a set-top box device.

FIG. 4 illustrates a flow chart of a second particular embodiment of a method of generating a modified video content including interactive content. In an illustrative embodiment, the method may be performed at the system of FIG. 1 or the system of FIG. 2.

The method includes, at 402, receiving video content at a set-top box device. For example, the video content may be received from a video content service provider via a data stream. To illustrate, the video content may be received as Internet Protocol Television (IPTV) data from a video content service provider.

The method may also include, at 404, receiving timing data that associates scene data with a portion of the video content. In a particular embodiment, the timing data may be received from the video content service provider. For example, the timing data may be received via a second data stream from the video content service provider. In yet another example, the timing data may be embedded in or sent with the video content. In yet another example, the timing data may be received from a second content provider, such as an interactive content service provider.

The method also includes, at 406, accessing the scene data defining a three-dimensional scene. For example, the scene data may be accessed from a local memory of the set-top box device. In another example, the scene data may be accessed from a remote computing device (e.g., a server) via a network. For example, the scene data may be accessed from a server of the interactive content service provider. Alternately, the scene data may be pre-loaded to the set-top box device and stored in the local memory of the set-top box device. The scene data may include object data defining at least one three-dimensional graphical object, and may be identified and accessed based at least in part on information associated with the video content. For example, the scene data may be accessed based on the timing data as described previously with reference to FIGS. 1-2.

In a particular embodiment, accessing the scene data includes receiving the scene data from the remote computing device via the network, at 408, and storing the scene data at the memory of the set-top box device, at 410. The scene data may be accessed from the memory after the portion of the video content is received.

The method may also include, at 412, processing the object data to render the at least one three-dimensional graphical object and to overlay the rendered at least one three-dimensional graphical object over the portion of the video content. Overlaying the at least one three-dimensional graphical object over the portion of the video content may generate dynamically modified video content based on the received video content. In a particular embodiment, the object data may be processed based on at least partially on the timing data. For example, the object data may be rendered at an appropriate time to synchronize the at least one rendered three-dimensional graphical object with target frames of the video content.

The dynamically modified video content may be sent to a display device, at 414. In a particular embodiment, user input may be received at the set-top box device, at 416. For example, the user input may be received via a user input device, such as a remote control device, that is communicably coupled to the set-top box device.

At 418, the at least one three-dimensional graphical object may be animated in response to the user input. For example, animating the at least one three-dimensional graphical object may include dynamically determining a displayed geometry of the at least one three-dimensional graphical object in accordance with the scene data. To illustrate, the rendered at least one three-dimensional graphical object may be able to appear to pass behind existing objects within the video content. In another example, the at least one three-dimensional graphical object may be animated by dynamically modifying shading, surface texture appearance, scaling, orientation, or motion characteristics.

Accordingly, the method of FIG. 4 may enable generation of modified video content and user interaction with the modified video content. Additionally, the method of FIG. 4 may enable use of user-defined three-dimensional graphical objects that are received from an interactive content service provider or stored locally at the memory of the set-top box device.

Figure 5:
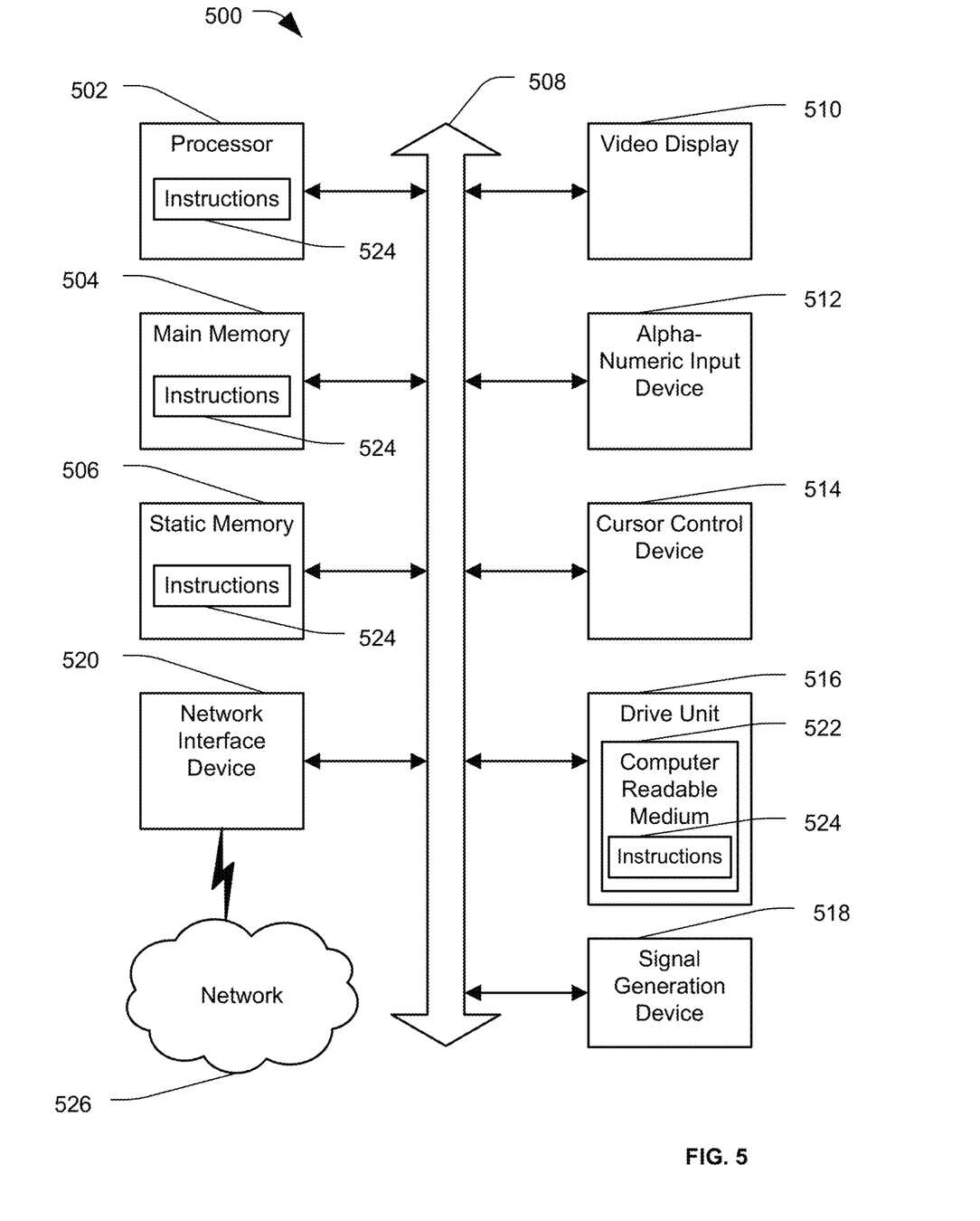
FIG. 5 is a block diagram of an illustrative embodiment of a general computer system.

Referring to FIG. 5, an illustrative embodiment of a general computer system is shown and is designated 500. For example, various components of the computer system 500 may include, implement, or be included within the set-top box device 110 of FIG. 1, the set-top box device 230 of FIG. 2, the servers 204 and 222 of FIG. 2, components thereof, or any combination thereof.

The computer system 500 includes a set of instructions 524 that can be executed to cause the computer system 500 to perform any one or more of the methods or computer based functions disclosed herein. The computer system 500, or any portion thereof, may operate as a standalone device or may be connected, e.g., using a network, to other computer systems or peripheral devices.

In a networked deployment, the computer system 500 may operate in the capacity of a set-top box device, a server, or a mobile computing device. The computer system 500 can also be implemented as or incorporated into various devices, such as a personal computer (PC), a tablet PC, a personal digital assistant (PDA), a mobile device, a palmtop computer, a laptop computer, a desktop computer, a communications device, a web appliance, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics-processing unit (GPU), or both. Moreover, the computer system 500 can include a main memory 504 and a static memory 506 that can communicate with each other via a bus 508. As shown, the computer system 500 may further include or be coupled to a video display unit 510, such as a liquid crystal display (LCD), an organic light emitting diode (OLED), a flat panel display, a solid-state display, or a projection display. For example, the video display unit 510 may be the display 114 of FIG. 1 or the display 214 of FIG. 2. Additionally, the computer system 500 may include an input device 512, such as a keyboard, a remote control device, and a cursor control device 514, such as a mouse. For example, the input device 512 may be the input device 244 of FIG. 2. The computer system 500 can also include a disk drive unit 516, a signal generation device 518, such as a speaker or remote control device, and a network interface device 520. The network interface device 520 may be coupled to other devices (not shown) via a network 526.

In a particular embodiment, as depicted in FIG. 5, the disk drive unit 516 may include a non-transitory computer-readable medium 522 in which one or more sets of instructions 524, e.g., software, can be embedded. For example, the instructions 524 may enable the computer system 500 to perform one or more methods or logic described herein. In a particular embodiment, the instructions 524 may reside completely, or at least partially, within the main memory 504, the static memory 506, and/or within the processor 502 during execution by the computer system 500. The main memory 504 and the processor 502 also may include non-transitory computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/item distributed processing, and parallel processing. Alternatively, virtual computer system processing can be constructed to implement one or more of the methods or functionality as described herein.

The present disclosure contemplates a non-transitory computer-readable medium that includes instructions 524 so that a device connected to a network 526 can communicate voice, video or data over the network 526. Further, the instructions 524 may be transmitted or received over the network 526 via the network interface device 520. For example, the network 526 may be one or more both of the network 212 of FIG. 2 and the network 228 of FIG. 2.

The terms "non-transitory computer-readable medium" and "non-transitory processor-readable medium" may include a single medium or multiple media, such as a centralized or distributed database, and/or associated caches and servers that store one or more sets of instructions. The terms "non-transitory computer-readable medium" and "non-transitory processor-readable medium" may also include any medium that is capable of storing a set of instructions for execution by a processor or that cause a computer system to perform any one or more of the methods or operations disclosed herein.

In a particular non-limiting, exemplary embodiment, the non-transitory computer-readable medium can include a solid-state memory such as a memory card or other package that houses one or more non-volatile read-only memories. Further, the non-transitory computer-readable medium can be a random access memory or other volatile re-writable memory. Additionally, the non-transitory computer-readable medium can include a magneto-optical or optical medium, such as a disk or tapes. Accordingly, the disclosure is considered to include any one or more of a non-transitory computer-readable storage medium and successor media, in which data or instructions may be stored.

It should also be noted that software that implements the disclosed methods may optionally be stored on a tangible storage medium. For example, the tangible storage medium may include a magnetic medium such as a disk or tape. As another example, the tangible storage medium may include a magneto-optical or optical medium such as a disk. As yet another example, the tangible storage medium may include a solid state medium such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet, other packet switched network transmission (e.g., TCP/IP, UDP/IP, HTML, X10, SIP, TR-069, INSTEON, WEP, Wi-Fi and HTTP) and standards for viewing media content (e.g., MPEG and H.264) may represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
    receiving video content at a set-top box device;
    receiving scene data defining a three-dimensional scene that is distinct from the video content and that corresponds to a scene of the video content;
    receiving object data defining a three-dimensional graphical object, wherein the scene data specifies physical properties to enable rendering of the three-dimensional graphical object, the physical properties indicating an effect of gravity on the three-dimensional graphical object and indicating whether the effect of gravity is to be simulated on the three-dimensional graphical object;
    processing the scene data and the object data to render the three-dimensional graphical object and to overlay the rendered three-dimensional graphical object over a portion of the video content to generate dynamically modified video content;
    sending the dynamically modified video content to a display device;
    after sending the dynamically modified video content to the display device, receiving a user request, at the set-top box device, to animate the three-dimensional graphical object; and
    in response to the user request, dynamically modifying a display characteristic of the three-dimensional graphical object.

2. The method of claim 1, wherein modifying the display characteristic of the three-dimensional graphical object includes rotating the three-dimensional graphical object.

3. The method of claim 1, wherein modifying the display characteristic of the three-dimensional graphical object includes modifying shading of the three-dimensional graphical object based partially on the scene data.

4. The method of claim 1, wherein modifying the display characteristic of the three-dimensional graphical object includes modifying a surface texture appearance of the three-dimensional graphical object based partially on the scene data.

5. The method of claim 1, wherein modifying the display characteristic of the three-dimensional graphical object includes modifying a geometry of the three-dimensional graphical object based partially on the scene data.

6. The method of claim 1, wherein modifying the display characteristic of the three-dimensional graphical object includes modifying scaling of the three-dimensional graphical object based partially on the scene data.

7. The method of claim 1, wherein modifying the display characteristic of the three-dimensional graphical object includes modifying motion characteristics of the three-dimensional graphical object based partially on the scene data.

8. The method of claim 1, wherein modifying the display characteristic of the three-dimensional graphical object includes moving the three-dimensional graphical object within a scene of the dynamically modified video content.

9. The method of claim 1, further comprising:
    receiving the scene data from a remote computing device via a network before receiving the video content; and
    storing the scene data at a memory of the set-top box device, wherein the scene data is accessed from the memory of the set-top box device after the portion of the video content is received.

10. The method of claim 1, further comprising receiving timing data that associates the scene data with the portion of the video content, wherein the object data is processed based on the timing data.

11. The method of claim 10, wherein the timing data is received via a first data stream and the video content is received via a second data stream that is distinct from the first data stream.

12. The method of claim 10, wherein the three-dimensional graphical object includes a user-defined object.

13. The method of claim 1, wherein the scene data is accessed by receiving a first data stream from a content provider of the video content, wherein the first data stream is distinct from a second data stream that includes the video content.

14. The method of claim 1, wherein the scene data is received from a first content provider and the video content is received from a second content provider that is distinct from the first content provider.

15. A set-top box device, comprising:
    a processor; and
    a memory accessible to the processor, the memory comprising instructions that are executable by the processor to perform operations comprising:
        receiving video content;
        receiving scene data defining a three-dimensional scene that is distinct from the video content and that corresponds to a scene of the video content;
        receiving object data defining a three-dimensional graphical object, wherein the scene data specifies physical properties to enable rendering of the three-dimensional graphical object, the physical properties indicating an effect of gravity on the three-dimensional graphical object and indicating whether the effect of gravity is to be simulated on the three-dimensional graphical object;
        processing the scene data and the object data to render the three-dimensional graphical object and to overlay the rendered three-dimensional graphical object over a portion of the video content to generate dynamically modified video content;
        sending the dynamically modified video content to a display device;
        after sending the dynamically modified video content to the display device, receiving a user request to animate the three-dimensional graphical object; and
        in response to receiving the user request, simulating motion of the three-dimensional graphical object based on the physical properties of the three-dimensional graphical object.

16. The set-top box device of claim 15, wherein the scene data further includes scaling and lighting information, wherein the scaling and lighting information is used to render the three-dimensional graphical object.

17. The set-top box device of claim 15, wherein the physical properties of the three-dimensional graphical object indicate an effect of a collision between the three-dimensional graphical object and another object.

18. A computer-readable storage device comprising instructions that, when executed by a processor, cause the processor to perform operations comprising:
    receiving video content;
    receiving scene data defining a three-dimensional scene that is distinct from the video content and that corresponds to a scene of the video content
    receiving object data defining a three-dimensional graphical object, wherein the scene data specifies physical properties to enable rendering of the three-dimensional graphical object, the physical properties indicating an effect of gravity on the three-dimensional graphical object and indicating whether the effect of gravity is to be simulated on the three-dimensional graphical object;

processing the scene data and the object data to render the three-dimensional graphical object and to overlay the rendered three-dimensional graphical object over a portion of the video content to generate modified video content;

sending the modified video content to a display device;

after sending the modified video content to the display device, receiving a user request to animate the three-dimensional graphical object; and in response to receiving the user request, dynamically modifying a display characteristic of the three-dimensional graphical object.

19. The method of claim 1, wherein the object data includes geometric information defining the three-dimensional graphical object.

* * * * *